United States Patent [19]

Peoples

[11] Patent Number: 5,438,616
[45] Date of Patent: Aug. 1, 1995

[54] METHOD AND APPARATUS FOR STORING TELEPHONE NUMBERS AND FOR AUTOMATICALLY CALLING THE STORED NUMBERS

[76] Inventor: John T. Peoples, 14 Blue Jay Ct., Warren, N.J. 07059

[21] Appl. No.: 204,087

[22] Filed: Mar. 2, 1994

[51] Int. Cl.6 .................... H04M 1/64; H04M 9/00
[52] U.S. Cl. .................... 379/201; 379/210; 379/211
[58] Field of Search ............ 379/201, 203, 204, 205, 379/210, 211, 212, 221

[56] References Cited

U.S. PATENT DOCUMENTS

| | | | |
|---|---|---|---|
| 4,535,199 | 8/1985 | Zink | 179/2 |
| 4,724,539 | 2/1988 | Hiskes | 379/205 |
| 4,899,373 | 2/1990 | Lee et al. | 379/207 |
| 5,251,250 | 10/1993 | Obata et al. | 379/59 |
| 5,253,288 | 10/1993 | Frey et al. | 379/221 |
| 5,291,551 | 3/1994 | Conn et al. | 379/265 |

Primary Examiner—James L. Dwyer
Assistant Examiner—Thomas Presson

[57] ABSTRACT

Techniques for establishing a connection with a calling party and a called party using the processing of an intermediary serving arrangement so as to minimize telephone costs and preserve privacy. During a first established telephony connection, the intermediary arrangement stores two telephone numbers as remotely provided by the calling party. The calling party and serving arrangement are connected during a second established connection using the first telephone number. The called party and serving arrangement are connected during a third established connection using the second telephone number. Upon successfully establishing the second and third connections, the calling party and called party are bridged for conversation.

9 Claims, 6 Drawing Sheets

METHOD AND APPARATUS FOR STORING TELEPHONE NUMBERS AND FOR AUTOMATICALLY CALLING THE STORED NUMBERS

BACKGROUND OF THE DISCLOSURE

1. Field of the Invention

This invention relates to telephony-type communication systems and, more particularly, to establishing calls between customers by remotely accessing each customer individually and then completing the connection between the customers.

2. Description of the Background Art

The art is devoid of teachings or suggestions pertaining to customer-premises equipment in connection with techniques for: (1) minimizing the cost of toll-type calls to the customer by remotely utilizing the full capability of third-party calling service (i.e., third-party bridging using a single incoming telephone line) provided by an Local Exchange Carder (LEC), or two incoming telephone lines, serving the customer premises; or (2) preserving the privacy of a called telephone number and, hence, a called party, as placed by a calling party by remotely using either the third-party calling service or the two incoming telephone lines serving the given customer premises.

Thus, a need exists in the art for such services, encompassing both circuitry and methodology, for providing such cost-minimizing and/or privacy-preserving techniques.

A patent representative of the technological field of the present invention is U.S. Pat. No. 5,251,250 issued to Obata et al (Obata). In Obata, there is shown a method and circuitry for storing a caller's telephone number as data in a memory wherein callers' telephone numbers received during an automatic telephone answering state can suitably be retained as data. Later, a user having access to the memory bank can display the stored telephone numbers to learn about the callers' telephone numbers placed during the user's absence.

SUMMARY OF THE INVENTION

These shortcomings and other limitations and deficiencies are obviated in accordance with the present invention by circuitry which utilizes either the third-party calling feature or two customer premises lines to mitigate telephone cost and preserve privacy.

Broadly, in accordance with the method aspect of the present invention, a first party and a second party are interconnected with a controller, the first party being at a location remote from the second party and the controller, the second party also being at a remote from the controller. Initially, a first connection is established between the first party and the controller by the first party placing a telephone call to a telephone number to which the controller is responsive. Once this connection is established, the controller receives and stores a first call-back telephone number and a second call-back telephone number as provided by the first party, the first number causing a first telephony device accessible to the first party to respond, and the second number causing a telephony device accessible to the second party to respond. Then the first connection between the first party and the controller is torn down by initiating conventional hang-up procedures. A second connection is re-established between the first party and the controller by operation of the controller to initiate a telephone call to the first call-back telephone number. Then, a third connection is established between the second party and the controller by operation of the controller to initiate a telephone call to the second call-back telephone number. Finally, the first party and the second party are bridged to allow conversation by coupling the second connection to the third connection.

BRIEF DESCRIPTION OF THE DRAWINGS

The teachings of the present invention can be readily understood by considering the following detailed description in conjunction with the accompanying drawings, in which.

To facilitate understanding, identical reference numerals have been used, where possible, to designate identical elements that are common to the figures.

DETAILED DESCRIPTION

After considering the following description, those skilled in the art will clearly realize that the teachings of my invention can be readily utilized in providing telephony-type services.

Figure 1:
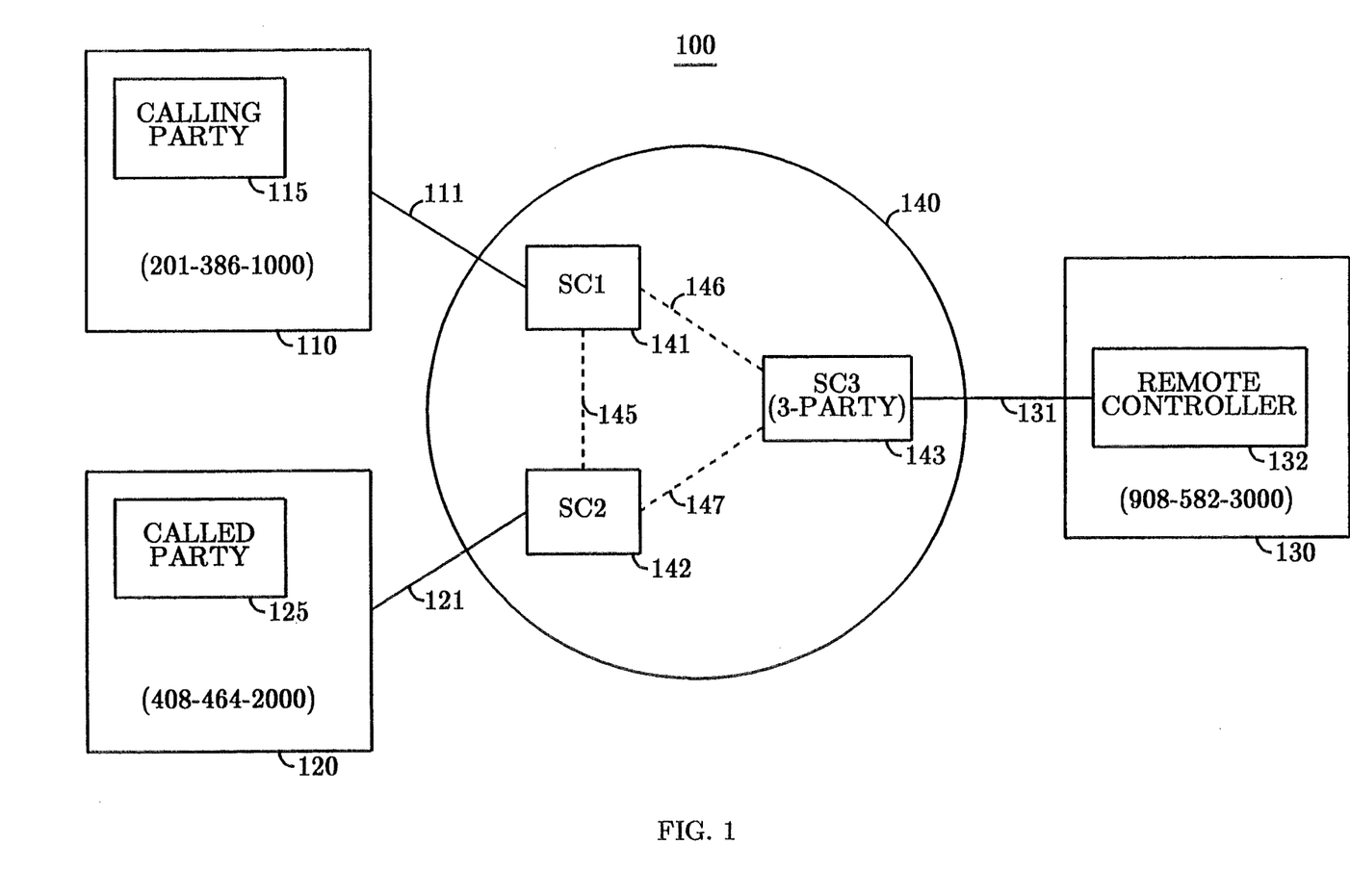
FIG. 1 illustrates a high-level block diagram of the telephone switching network used to interconnect a calling party to a called party via third-party calling in accordance with the present invention.
Figure 2:
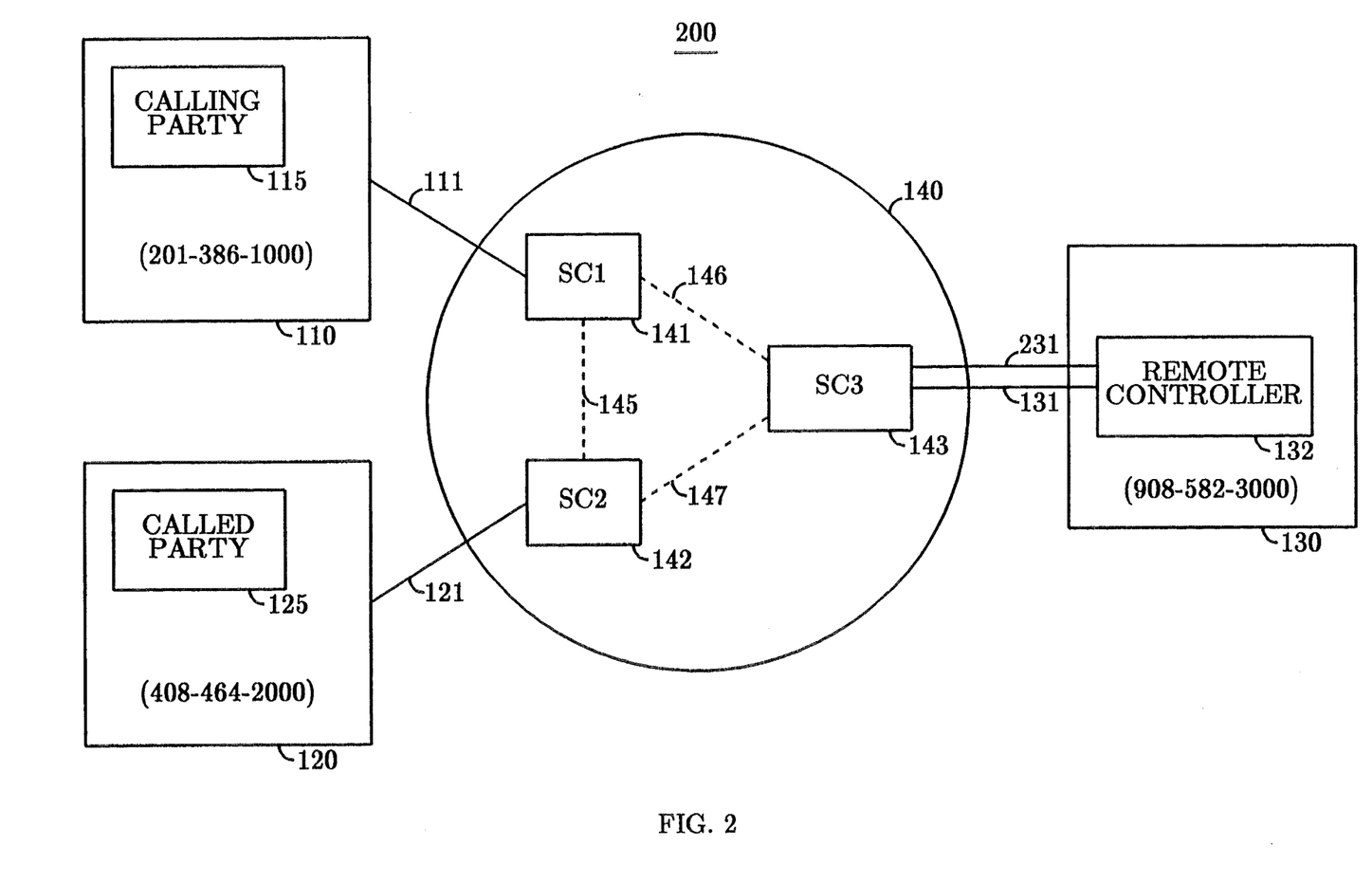
FIG. 2 illustrates a high-level block diagram of the telephone switching network used to interconnect a calling party to a called party using two separate subscriber lines in accordance with the present invention.

With reference to FIG. 1, there is shown high-level block diagram 100 illustrating public switched telephone network 140 for interconnecting calling party 15 at location 110 to called party 125 at location 120; FIG. 1 is useful for contrasting the conventional interconnecting arrangement with an arrangement in accordance with the present invention (which will be described shortly). Calling location 110 is connected to telephone network 140 via subscriber loop 111 terminating on switching center 141 (SC1), whereas called location 120 is connected to telephone network 140 via subscriber loop 121 terminating on switching center 142 (SC2). Illustratively, subscriber loop 111 is assigned a telephone number given by 201-386-1000 (area code-NNX-exchange number), whereas subscriber loop 121 is assigned telephone number 408-464-2000; for the sake of specificity, area code 201 is in New Jersey and area code 408 is in California.

Conventionally, if calling party 115 desires to communicate with called party 125, calling party 115 "keys-in" or dials the telephone number (408-464-2000) assigned to subscriber line 121, i.e., location 120, of called party 125, and the call is setup by linking serving center 141 with serving center 142 via INTER-LATA connection 145 which may be provided by an inter-exchange carder (IXC). The cost for such an established call generally depends upon the manner in which calling party 115 initiated the call. For example, calling party 115 may have directly "keyed-in" the telephone number assigned to the location of called party 125

(1-408-464-2000) from a private residence so the call will be billed to the calling telephone number (201-386-1000); on the other hand, calling party 115 may have arranged to have the called billed to his/her calling card by first "keying in" 0-408-464-200 and then "keying in" the credit card number to be billed. If the call was placed from a public "coin" telephone (not shown) at location 110, the total bill may also include a component charged by the local provider of the telephone "coin" telephone equipment.

It is now supposed, in accordance with one aspect of the present invention, that calling party 115 desires to communicate with called party 125 but further desires to have the call automatically charged to another telephone number, say 908-582-3000, without intervention and/or knowledge on the part of the IXC or the local exchange carrier (LEC); this number is assigned to remote location 130 which is served from switching center 143 (SC3) of network 140 via subscriber line 131. It may be that calling party 115 is merely visiting a private residence assigned telephone number 201-386-1000 and does not wish to impose upon the owner of the residence by having a potentially large toll charge billed directly to such owner, but would rather shift the burden of the cost to himself/herself by having the call billed to his/her home telephone number, namely, 908-582-3000 (which is also in New Jersey). If switching center 143 provides the conventional service offered by the LEC called three-party or "3-way" calling, then it is possible to mitigate the telephone charges to 201-386-1000 by introducing remote controller 132 at location 130 and configuring controller 132 to operate generally according to the following steps:

(a) establishing a connection with calling party 115 (that is, calling party 115 "keys-in" 1-908-582-3000 from location 110, thereby interconnecting party 115 to remote controller 132 via INTER-LATA path 146 linking switching centers 141 and 143);

(b) receiving and storing call-back telephone number 1-201-386-1000 and called telephone number 1-408-464-2000 "eyed-in" by calling party 115;

(c) upon breaking the connection between calling party 115 and controller 132 (e.g. by party 115 hanging up), controller 132 initiates a return call to calling party 115 by "keying" 1-201-386-1000 (which call will be carried by INTRA-LATA path 146 to switching center 141) and then activates the standard third-party calling function to place another call to 1-408-464-2000 (which call is carded by INTER-LATA path 147 to switching center 142);

(d) whenever called party 125 answers the incoming call, the third-party service automatically bridges party 115 to party 125 for communication utilizing switching center 143's third-party service; and (e), upon termination of the third-party call, controller 132 automatically resets to accept another incoming call.

From this description, it is clear that the only charge to the owner of telephone number 201-386-1000 is a short INTRA-LATA call to 908-582-3000. The significant cost is home by the party assigned to 908-582-3000 (in this example, visiting calling party 115) since simultaneous INTRA-LATA and INTER-LATA calls result from the desired connection between party 115 at location 110 and party 125 at location 120.

In another aspect of the present invention, it is supposed that location 110 is the work location of party 115, location 130 is party's 115 home premises, and party 125 at location 120 is someone whose identity party 115 desires to keep in confidence, that is, party 115 does not wish to have the telephone number (408-464-2000) of party 125 appear on any telephone log for the originating telephone number (201-386-1000); party 125 may be, for example, party's 115 doctor or lawyer. In accordance with the technique described above, the only number that will appear on the telephone log of party 115 at location 110 will be the home telephone number of party 115 because party 115 initiates call set-up by controller 132 by placing a call to the telephone number assigned to location 130. In turn, the call back to party 115 and the call to party 125 are listed in the telephone log of telephone number 908-582-3000.

Whereas the foregoing description has focused on providing "call-back" service using third-party bridging, it is possible to provide the equivalent service even if a customer does not subscribe to "third-party" calling, either because it is unavailable or the customer desires not to incur the cost of such "third-party" calling service. The equivalent service can be provided using two incoming telephone lines to a customer premises—often two such lines are available because a customer has a second line for use by children in the household (the so-called "teenager" line). In the illustrative embodiment discussed below, the two incoming line case is covered in detail; then the steps explicitly required to provide the service for the "third-party" case is contrasted to the two-line case.

Illustrative Embodiment

Figure 3:
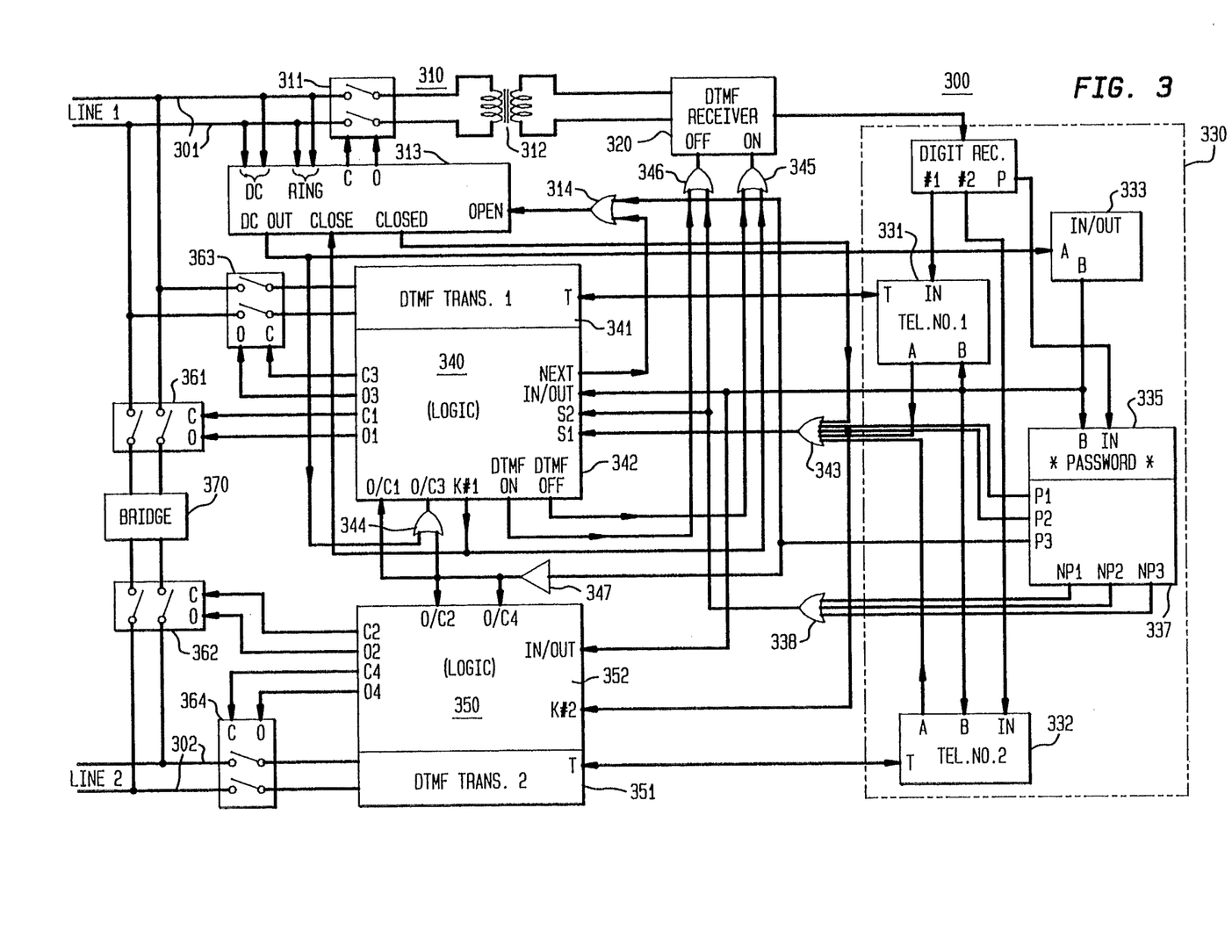
FIG. 3 is a block diagram of an illustrative embodiment of one the two separate-line aspect of the present invention.

With reference to FIG. 3, there is shown, in electrical block diagram form, MAnaginG Incoming Call (MAGIC) controller 300 connected to two separate incoming telephone lines. Telephone subscriber lines 301 and 302 are conventional loops that are connected to a conventional telephone central office (not shown) which offers standard "touch-tone" calling. To provide an operational description as well as a circuit description of controller 300, the operation of the components is described in one illustrative communication sequence as an incoming call arrives on line 301 (Line 1) from the calling party (such as party 115 in FIG. 1) so as to set-up and use controller 300. Other variations of the sequence are readily understood by one of ordinary skill in the art once the teachings and suggestions of the circuitry of FIG. 3 are comprehended.

Processor 330 of controller 300 has two operational states, namely, (a) an IN mode wherein the two telephone numbers are received from a calling party and stored for later use, and (b) an OUT mode wherein individual calls are placed to each of the two telephone numbers input by the calling party during the IN mode; processor 330 is initialized to the IN mode upon power-up to await an incoming telephone call. The IN/OUT mode register 333 provides a flag for the mode.

Line interface device 310 is composed of detection/logic circuitry 313 which detects the standard ringing signal appearing on line 301; the input from line 301 into circuitry 313 for ringing detection is provided by the RING port. When ringing is detected (typically after, say, 4–5 rings to allow a person at the location of the incoming call to answer any phone on line 301 in fewer rings to thereby override the controller and thus handle the incoming call as an ordinary call), logic 313 signals switch 311 to close via the C port of circuitry 313. When switch 311 closes, line 301 is effectively "answered" by providing the equivalent of an "off-hook" state, that is, line 301 is coupled through repeat coil 312 to DTMF (Dual-Tone, Multi-Frequency) receiver 320; receiver 320 is not yet activated to accept incoming digits keyed in by the calling party, but it will be activated shortly as discussed below. Initially, DTMF transmitter circuitry 340 is placed in a mode corresponding to the IN mode of register 333; this is accomplished by coupling the B port of register 333 to the IN/OUT port of DTMF circuitry 340. To initiate a process so as to inform the calling party that controller 300 is being activated to accept incoming digits, circuitry 313 sends a signal to DTMF circuitry 340, which is composed of DTMF transmitter 341 and logic circuitry 342, indicating that ringing has been detected and that switch 311 is closed; this initiation signal is emitted from the CLOSED port of circuitry 3 13 to DTMF circuitry 340 through OR gate 343 to the S1 port of logic 342. The first signal received on the S 1 port while DTMF circuitry is in the IN mode causes two operations, namely, (a) closing of switch 363 via a signal sent from port C3 of logic circuitry 342; and (b) emitting an audible signal (such as a "beep" tone) by DTMF transmitter 341 onto line 301 via switch 363 to alert the calling party that controller 300 is ready to sequentially accept the two telephone numbers of interest. In this mode of operation, DTMF 341 need not draw "dial tone" (since coil 312 completes the DC path) so DTMF 341 may be AC-coupled to line 301. Once the audible signal is discontinued (typically the tone would be active for a predetermined interval of say 3 seconds), a signal emanating from the DTMF OFF port of circuitry 342 is transmitted to OR gate 345 and, in turn, to the ON port of DTMF receiver 320 to activate receiver 320.

The first number keyed in by the calling party is the party's so-called confirmation code, referred to as the PASSWORD. The PASSWORD begins and ends with the same delimiter, such as the "star" (*) key of a touch-tone key pad, and is stored in register 335 in processor 330. The PASSWORD assigned to the controller is selected off-line beforehand and can be provided and stored in any conventional manner such as, for example, by the setting of a bank of DIP switches (not shown). Presuming the set of digits keyed in by the calling party corresponds to the correct PASSWORD, then an audible signal (such as the beep tone again) is supplied to the calling party by sending an enable signal from the P1 port of logic 337 coupled to register 335 to OR gate 343 and, in turn, to the S1 port of logic 342. An audible signal alerts the calling party that controller 300 is ready to accept telephone number-type information. If the set of digits representative of the PASSWORD provided by the calling party has the proper beginning and ending delimiter, but the intermediate digits are not correct, then a second audible signal (such as an interrupted "beep" tone) could provide an indication to the calling party to try again after the second audible signal is removed. This action is initiated by passing a signal from the NP1 port to OR gate 338 and, in turn, port S2 of logic 342. During the interval of application of either the first or second audible signal, DTMF receiver 320 is turned OFF via a signal from the DTMF ON port of logic 342 and OR gate 346. DTMF receiver 320 is turned back on once either audible signal is removed via the DTMF OFF port and OR gate 345. If the proper password is not received within a predetermined interval, controller 300 is typically reset to its initial IN mode.

Assuming that the PASSWORD is received correctly, the calling party keys in the first telephone number, that is, the number assigned to the line presently utilized by the calling party to place the incoming call to controller 300. DTMF receiver 320 detects each individual digit and passes each digit to the DIGIT RECeive port of processor 330. Since this is the first set of digits received by processor 330 after the PASSWORD, the digits are passed to TELEPHONE NO. 1 memory device 331. In order to simply differentiate between local and long distance telephone numbers (7 digits versus 10 digits), the calling party ends the string of keyed-in digits with a delimiter, such as the "star" (*) symbol. Once device 331 receives the digits, the calling party is alerted to the reception and storage of the digits with the audible signal.

This signal is initiated by device 331 passing an enable signal from its A port to OR gate 343. The audible signal is emitted from DTMF transmitter 341 and passed through switch 363, which is still closed, to line 301. While the DTMF audible tone is present, DTMF receiver 320 is deactivated by a control signal passed from DTMF ON port of logic 342 to the OFF port of DTMF receiver 320; once audible tone is removed, then DTMF receiver 320 is reactivated by a signal passed from the DTMF OFF port of device 340 to the ON port of receiver 320. (As an option, not shown, the digits could be "voice synthesized" and repeated to the calling party to verify the correctness of the digits. If they are correct, a * key depression by the calling party could indicate this; if they are not correct, then a # key depression would allow register 331 to be reset to accept a new set of digits).

The calling party, upon momentarily hearing the audible signal, now keys in the digits representing the second telephone number, that is, the number of the called party. DTMF receiver 320 decodes each digit and passes the digits to the DIGIT REC port of processor 330. In turn, the digits are passed to TELEPHONE NO. 2 memory device 332. Once the digits stored in device 332 are determined as acceptable (the string of digits may again be delimited by *), a control signal is passed from the A port of device 332 to the S1 port of logic 342 via OR gate 343. Again, an audible signal is emitted from DTMF transmitter 341 to the calling party on line 301. DTMF receiver 320 is turned off during the presence of the audible tone. In addition, since two telephone numbers have been received correctly, logic circuitry 342 opens switch 363 by passing a control signal from the 03 port of circuitry 341 to the 0 port of switch 363. Also, logic 342 prepares device 310 for the next mode (OUT) by signaling device 3 10 to open switch 311 by passing a signal from the NEXT port of logic 342 to OR gate 314 and, in turn, to the OPEN port of logic 313. The calling party also hangs up after hearing this last audible signal.

The normal processing by the local central office brings down the connection between the calling party and the controller once the calling party and controller "hang up", in effect. Once a Direct Current voltage signal is sensed on line 301 which is above a predetermined threshold in magnitude at the DC port of logic 313, thereby indicating that the "on-hook" state of controller 300 has been re-established, an enable signal is emitted from the DC OUT port of logic 313 to the A port of the IN/OUT mode register 333 and OR gate 344—gate 344 connects to the open/close port associated with switch 363 (O/C3 port). This enable signal causes mode register 333 to switch to the OUT mode, that is, the mode for keying out the two stored telephone numbers, and causes logic 342 to: close switch 363; provide a DC path to draw dial tone from the central office over line 301 as initiated by DTMF transmitter 341; and extract TELEPHONE NO. 1 from device 331 for use by DTMF transmitter 341 to initiate an outgoing call over line 301. In addition, when register 333 raises the OUT flag, a signal is sent from its B port to the B port of devices 331,332, and 337 to prepare these devices for the keying out mode of operation. In this mode, the first expected response from the calling party when the party answers the first outgoing call is the PASSWORD, so device 335 is activated. Also, TELEPHONE NO. 1 is passed between device 331 and transmitter 34 1 over their respective T ports.

Once TELEPHONE NO. 1 has been keyed out, detection device 310 is reactivated to close switch 311 by passing an activation signal from the K#1 port of device 342 to the CLOSE port of device 310, and DTMF receiver 320 is turned on via its ON port coupled to OR gate 345. (In this mode, coil 312 can be AC-coupled to line 301 since DTMF transmitter 341 employs a DC path to draw dial-tone). Controller 300 is notified that the first party (the original calling party) has answered the outgoing call by the receipt of a string of digits representing the calling party's PASSWORD.

Presuming the set of digits keyed in by the first party upon answering the call back is the correct PASSWORD, then an audible signal (such as a beep tone) is supplied to the first party by sending an enable signal from the P2 port of logic 337. This alerts the first party that the second party will now to be called. If the set of digits representative of the PASSWORD has the proper beginning and ending delimiter, but the digits are not correct, then a second audible signal (such as an interrupted "beep" tone) would provide an indication to the first called party to try the PASSWORD again after the second audible signal is removed. This action is initiated by passing a signal from the NP2 port to OR gate 338 and, in turn, port S2 of logic 342. During the interval of application of the second audible signal, DTMF receiver 320 is turned OFF via OR gate 346. This action continues until the correct PASSWORD is received or a time-out occurs—if a time-out occurs, then controller 300 is completely reset.

Figure 6:
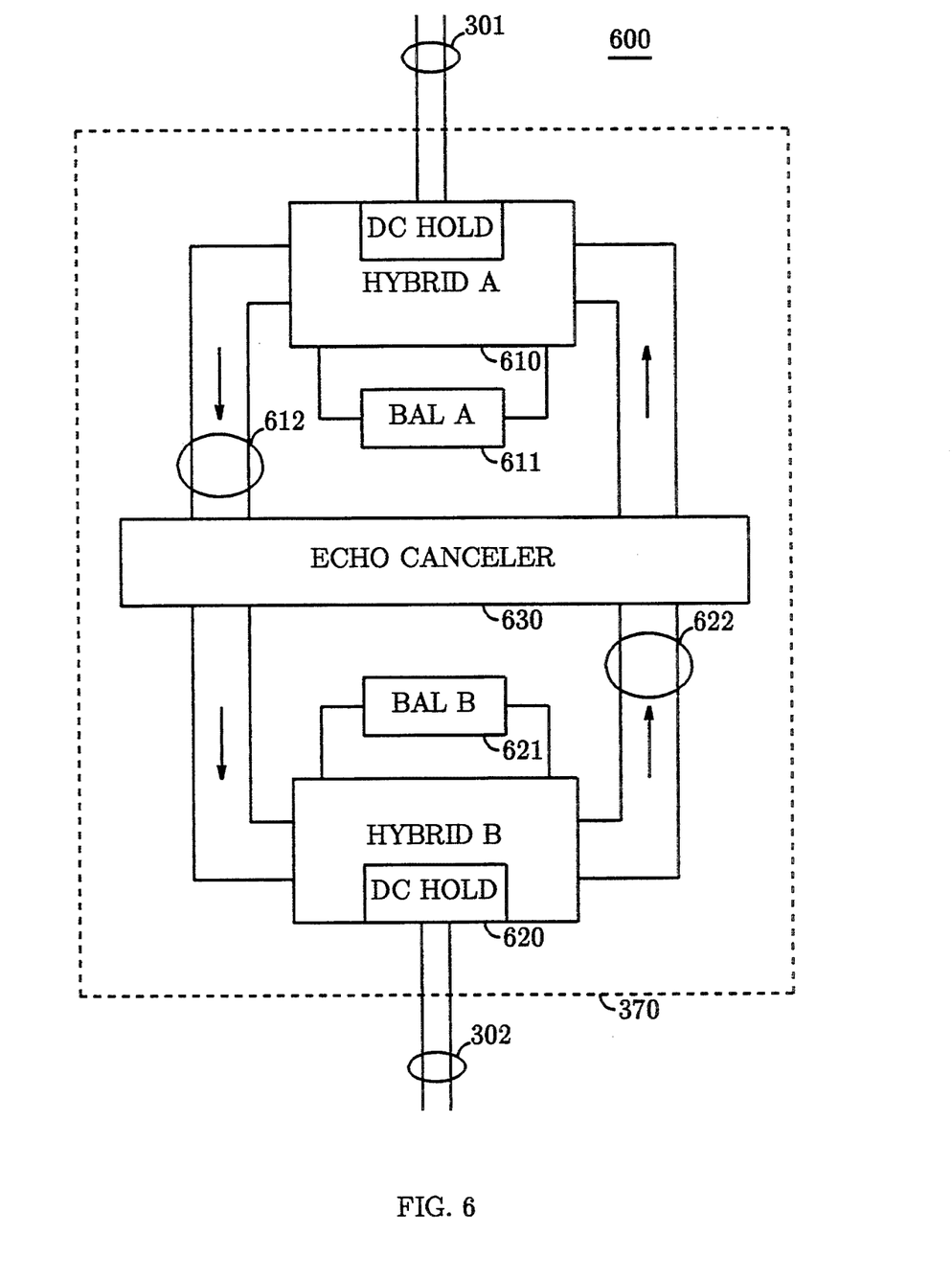
FIG. 6 is a block diagram for an illustrative bridging network depicted in FIG. 4.

The correct PASSWORD enables logic 342 to both close switch 361 and open switch 363. Switch 361 is connected to bridge 370 which serves the function of interconnecting lines 301 and 302 once both the first and second calls have been answered. Bridge 370 is a conventional device that couples a telephone-type receiver associated with line 301 to a telephone-type transmitter associated with line 302, and also couples a telephone-type receiver associated with line 302 to a telephone-type transmitter associated with line 301—such a bridge may be configured with hybrid networks that implement two-to-four wire conversion, and appropriate balancing networks. Bridge 370 is also arranged with DC paths at both ports to hold any connection that has been established. A block diagram of an illustrative bridge is shown in FIG. 6.

Presuming the called party has answered the incoming call at the remote location, and supplied the PASSWORD, DTMF transmitter 352 receives an enable signal to key-out the second telephone number; this enable signal is received by the K#2 port from the P2 port of logic 337. The enable signal causes logic 352 to close switch 364, DTMF transmitter 351 to draw dial tone, and then transmitter 351 keys TELEPHONE NO. 2 onto line 302 (Line 2). After the second party has been called, logic 352 causes switch 362 to close, via the C2 port, and switch 364 to open, via the 04 port. At this point in the operation, the first party can hear the ringing signal being applied to alert the second party at their remote location.

Assuming the second party answers the phone, the conversation between the parties may commence immediately via the bridge 370, which holds the DC connections of lines 301 and 302, and which also AC-couples the speech path of each party. DTMF receiver 320 stays activated to await touch-tone signals. When the conversation is complete, the second party is instructed to hang up their handset. The first party then keys in the PASSWORD which now acts as a disconnect signal. PASSWORD device 335 remains active to receive the keyed-in set of digits. If there is a match, then a signal emitted on port P3 of logic 337 enables both logic devices 342 and 352 to open all switches, namely, switches 361-364, via the 01-04 ports, respectively. If the PASSWORD is not correct, the first party is alerted to resubmit the PASSWORD by enabling port S2 of logic 342 via OR gate 338 and the NP3 port of logic 337 to ensure that the first party truly desires to tear down the connection. The enable signal on port P3 of logic 337 also is passed to the OPEN port on interface 310, via OR gate 314, to cause the opening of switch 311 and thereby the recoupling of DTMF receiver 320 from line 301.

If the second party does not answer the phone, the first party may signal their desire to disconnect by keying in the PASSWORD. Detection of the PASSWORD causes an enable signal to issue on port P3 of logic 337, again causing all switches 361-364 to open, as well as switch 311, as was describe above in detail.

Figure 4:
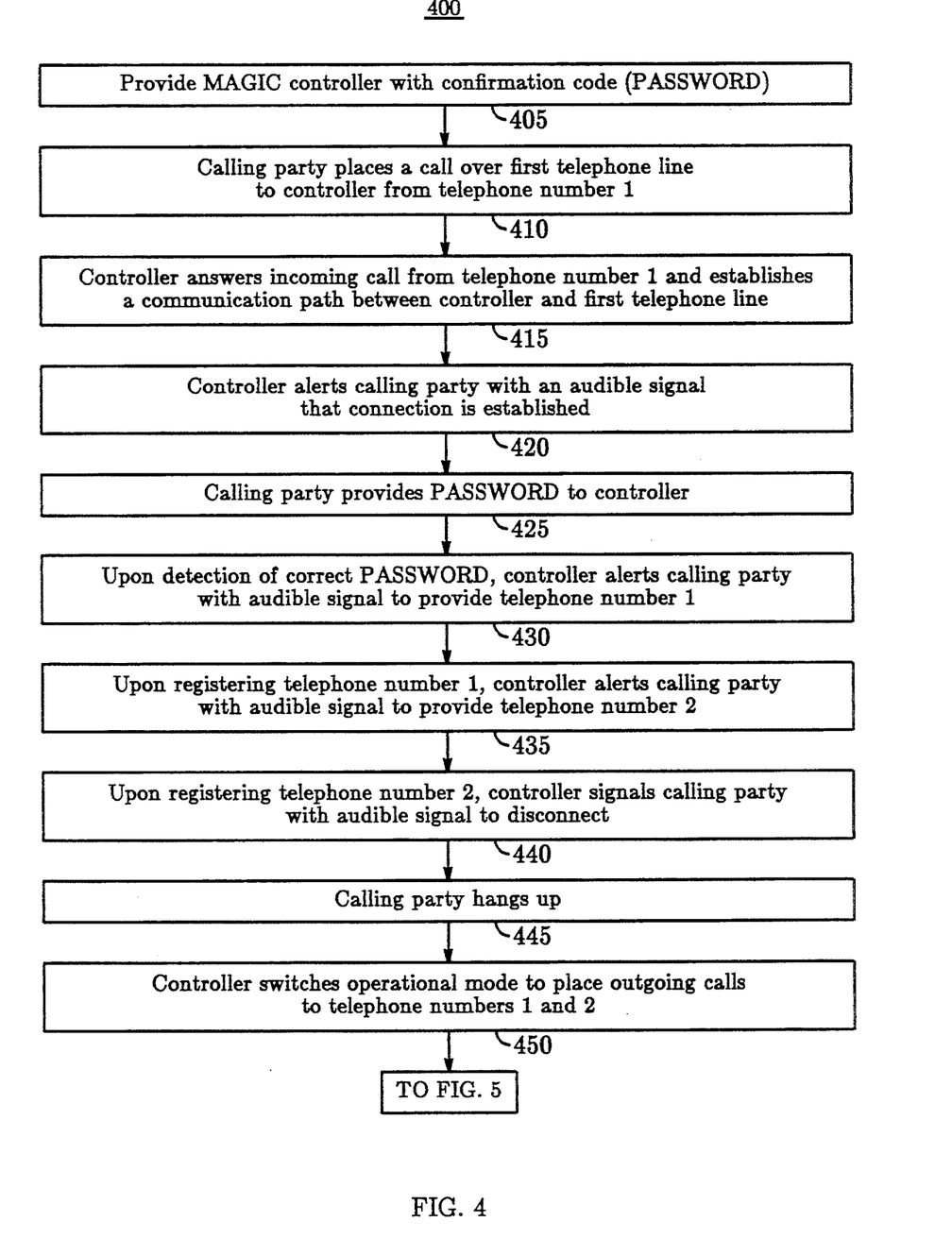
FIGS. 4 and 5 depict a flow diagram representative of the operation of the circuitry of FIG. 3.
Figure 5:
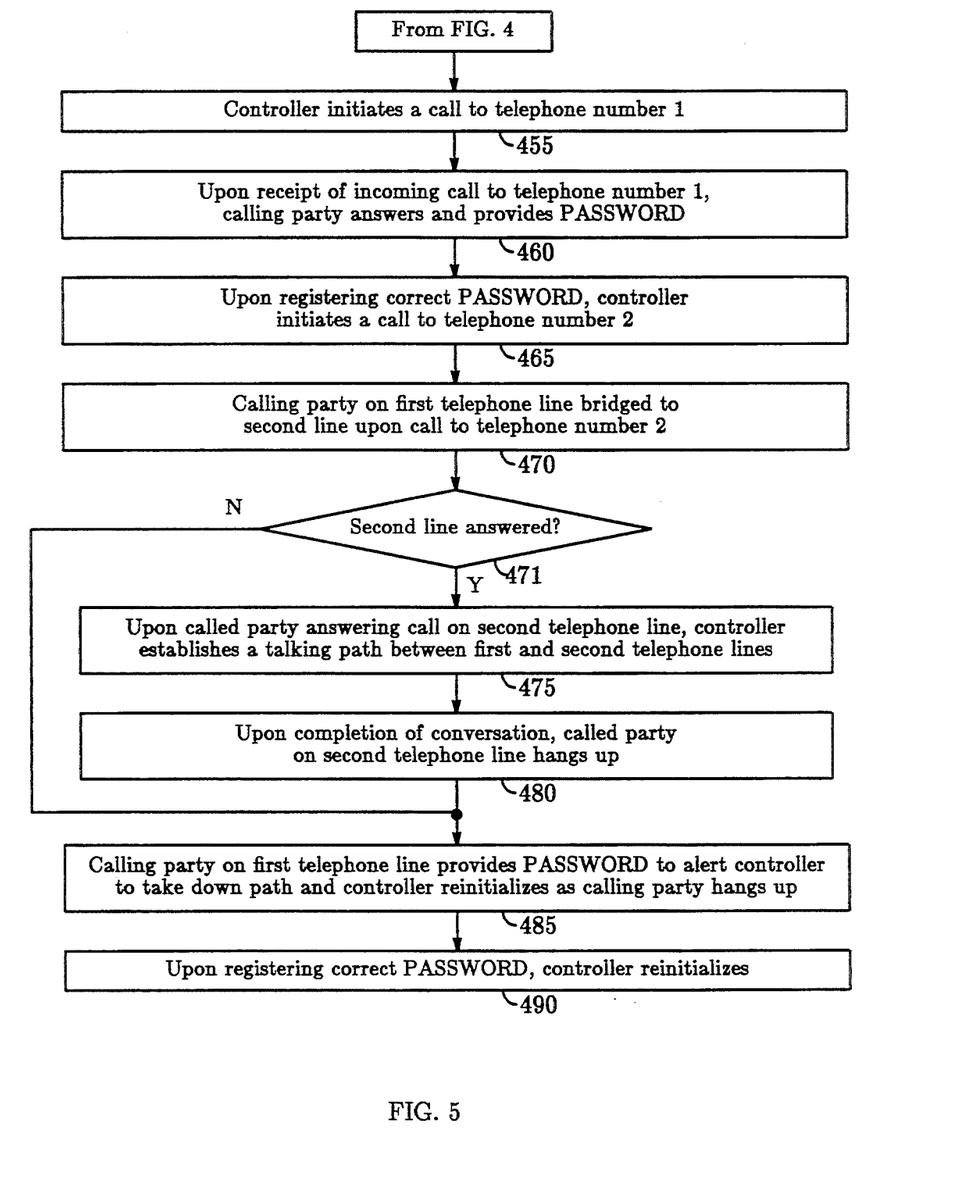

Flow diagram 400, encompassing both FIGS. 4 and 5, provides a succinct summary of steps of the process for the two separate outgoing lines presuming that a confirmation code has initially been input and stored in controller (block 405):

1. call to MAnaginG Incoming Call (MAGIC) controller (controller) from a first telephone number by first or calling party (block 410) which establishes a connection with the calling party (block 4 15) and sends a signal indicative of this established connection (block 420);
2. first party keys-in a confirmation code (PASSWORD), and upon correct code, controller is activated to receive telephone numbers (block 425) and sends signal indicative of this activation (block 430);
3. first party keys-in the first telephone number for detection by the controller, which is presumed to be connected to a serving switching center or local central office offering conventional touch-tone calling (block 435);
4. the controller stores first telephone number and signals first party to enter a second telephone number of a second party to be called or called party (block 435);
5. first party keys-in the second telephone number (block 435);
6. the controller stores the second telephone number (block 440)

7. the first party terminates the original call such as by hanging up the handset (block 445) and the controller switches operational mode (block 450);
8. the controller initiates a first outgoing telephone call to the first telephone number by drawing dial tone on the first line and "touch-toning" the first telephone number for processing by the serving switching center (block 455);
9. the first party answers the incoming call to the first telephone number and keys-in a confirmation code (block 460);
10. the controller detects that the outgoing telephone call has been answered by the proper first party by sensing the transmitted confirmation code (block 465);
11. the controller initiates a second outgoing call to the second telephone number by drawing dial tone on the second line and "touch-toning" the second telephone number for processing by the serving switching center (block 470);
12. the controller bridges the second outgoing call to the first party so the first party may listen to the ting-back signal from the second outgoing call (block 470);
13. if the second party answers the second outgoing call, the first party and second party may immediately begin conversation since the parties are already bridged (block 475);
14. if the second party does not answer the second outgoing call within an expected time interval, the first party signals the controller to drop both connections by keying-in the confirmation code (block 472);
15. whenever the first party and second party finish communicating, the second party drops off the connection such as by hanging up the telephone handset associated with the second telephone number (block 480);
16. the first party signals the controller to drop the connection to the first party by keying-in the confirmation code (block 485); and
17. the controller monitors the bridged call for the confirmation code and, upon receipt of such a code, disconnects the controller from the third-party call such as performing a function equivalent to hanging up a telephone instrument associated with the controller (block 490).

Whereas the illustrative embodiment described in detail above utilized two customer premises lines, it is also possible to arrange controller 300 in an alternative embodiment (although each embodiment may be contained in the same physical package and only a toggle-type switch need be thrown in order to make the two-line version or the "third-party" version operative, at the discretion of the customer, depending on how the customer premises is wired for telephone service). Given the details presented above for one version of controller 300, it is obvious to one skilled in the art how such an alternative arrangement may be constructed. The following steps provide an operational description indicating the steps carried out by such a modified controller 300.

The succinct summary of steps of the process for "third party" calling (presuming that a confirmation code has initially been input and stored in controller) is as follows:

1. call to MAnaginG Incoming Call (MAGIC) controller (controller) from a first telephone number by first or calling party which establishes a connection with the calling party and sends a signal indicative of this established connection;
2. first party keys-in a confirmation code (PASSWORD), and upon correct confirmation code, controller is activated to receive telephone numbers and sends signal indicative of this activation;
3. first party keys-in the first telephone number for detection by the controller, which is presumed to be connected to a serving switching center offering third-party calling ("3 way calling");
4. the controller stores first telephone number and signals first party to enter a second telephone number of a second party to be called or called party;
5. first party keys-in the second telephone number;
6. the controller stores the second telephone number (option—controller "repeats" second telephone number such as by voice synthesis to first party and requests confirmation from first party before storing second telephone number) and signals the first party to terminate the original call;
7. the first party terminates the original call such as by hanging up the handset;
8. the controller initiates a first outgoing telephone call to the first telephone number by drawing dial tone and "touch-toning" the first telephone number for processing by the serving switching center;
9. the first party answers the incoming call to the first telephone number and keys-in a confirmation code;
10. the controller detects that the outgoing telephone call has been answered by the proper first party by sensing the confirmation code (or, as an alternative, the absence of ring-back signal);
11. the controller activates the third-party calling service provided by the serving switching center Coy a mechanical/electrical operation equivalent to "flash" depressing the switch-hook on the telephone instrument coupled to the controller, that is, momentarily breaking the DC current path of the controller's subscriber line);
12. upon activation of the third party connection as sensed by drawing a second dial tone, the controller initiates a second outgoing call to the second telephone number by "touch-toning" the second telephone number for processing by the serving switching center;
13. the controller bridges the second outgoing call to the first party so the first party may listen to the ting-back signal from the second outgoing call (bridging is again accomplished by a mechanical/electrical operation equivalent to again "flash" depressing the switch-hook of the telephone instrument coupled to the controller);
14. if the second party answers the second outgoing call, the first party and second party may immediately begin conversation since they are automatically bridged via the standard third-party service provided by the serving switching center;
15. if the second party does not answer the second outgoing call within an expected time interval, the first party signals the controller to drop both connections by keying-in the confirmation code;
16. whenever the first party and second party finish communicating, the second party drops off the connection such as by hanging up the telephone handset associated with the second telephone number;

17. the first party signals the controller to drop the connection to the first party by keying-in (or dialing) the confirmation code; and 18. the controller monitors the bridged call for the confirmation code and, upon receipt of such a code, disconnects the controller from the bridged call such as by performing a function equivalent to hanging up a telephone instrument associated with the controller.

The block diagram 600 of FIG. 6 illustrates an embodiment of bridge 370 shown in FIG. 3. In FIG. 6, incoming line 301 connects to hybrid 610. Hybrid 610 has at its input a DC hold path, and balancing network 611 couples to hybrid 610 to mitigate trans-hybrid transmission. Similarly, incoming line 302 connects to hybrid 620. Hybrid 620 has at its input a DC hold path, and balancing network 62 1 couples to hybrid 620 to mitigate trans-hybrid transmission. Echo canceler 630 reduces the trans-hybrid transmission that balancing networks 611 and 612 cannot completely eliminate. The arrangement of FIG. 6 is a typical 2-4 wire coupling arrangement well-known in telephony Of course, other arrangements may be contemplated by one of ordinary skill in the art given the functionality that is desired, namely, to bridge lines 301 and 302 for two-way or hi-directional conversation.

There are other possible embodiments and/or configurations that are readily contemplated by one of ordinary skill in the art; these include:

1. first telephone number already stored in the controller—such as the first party's work telephone number;
2. first party is called back prior to keying-in the second telephone number so that the first party may directly provide the second telephone number;
3. the controller "repeats" each telephone number such as by voice synthesis to first party and requests confirmation from first party before storing each telephone number;
4. the first party maintains control of the initial hang-up by providing a confirmation code to initiate taking down of the connection while the controller is in the IN mode;
5. the MAGIC controller can be programmed to call back the first or calling party a number of times in case the first telephone line is put in use from the time of initial hang-up to the call back;
6. only one DTMF transmitter is required and it may be time-shared;
7. the service outlined above is envisioned as also being an applique to effect an improved "answering machine"-type device—similar to providing a code to turn off the usual recorder answering message and retrieve the incoming recorded messages—only this new or second code re-directs the "answering machine" processing; and
8. it is also possible to envision such a service as being provided to a customer by a central switching center under control of the LEC. In this mode of operation, the first party could call a "special" number and could then key in the two telephone numbers to the local switch; the local switch would be arranged with a functionality equivalent in operation to controller 300.

Although various embodiments which incorporate the teachings of the present invention have been shown and described in detail herein, those skilled in the art can readily devise many other varied embodiments that still incorporate these teachings.

I claim:

1. A method for interconnecting a first party and a second party with a controller wherein the controller is connected to a serving switching center by two separate telephone loops terminating at a subscriber premises, the first party being at a location remote from the second party and the controller, the second party also being at another remote location, the method comprising the steps of establishing a first connection between the first party and the controller over the first loop by the first party placing a telephone call to a telephone number to which the controller is responsive, receiving and storing in the controller a first call-back telephone number and a second call-back telephone number as provided by the first party, the first number causing a first telephony device accessible to the first party to respond, and the second number causing a second telephony device accessible to the second party to respond, taking down the first established connection on the first loop between the first party and the controller, establishing a second connection between the first party and the controller over the first loop by operation of the controller to initiate a telephone call to the first call-back telephone number, establishing a third connection between the second party and the controller over the second loop by operation of the controller to initiate a telephone call to the second call-back telephone number, and bridging the first party and the second party by coupling the second connection to the third connection within the controller located at the subscriber premises.

2. A method for interconnecting a first party and a second party with a controller located at a subscriber premises and connected to a serving switching center via first and second telephone loops having associated telephone numbers, the first party being at a location remote from the second party and the controller, the second party also being at a remote location from the controller, the method comprising the steps of calling the controller at the associated telephone number of the first telephone loop from a first telephone number by the first party to establish a connection with the first party and sending by the controller a signal indicative of this established connection, keying-in by the first party a confirmation code, and upon the controller receiving the correct code, activating the controller to receive telephone numbers and sending a signal indicative of this activation, keying-in by the first party a first telephone number for detection by the controller, the first telephone number being associated with the location of the first party, storing in the controller the first telephone number and signaling the first party to enter a second telephone number of a second party to be called, keying-in by the first party a second telephone number for detection by the controller, storing in the controller the second telephone number and signaling the first party of the successful reception of the second telephone number by signaling the first party to hang-up, terminating the established call and switching the operational mode of the controller to place outgoing calls to the two stored telephone numbers, initiating by the controller a first outgoing telephone call to the first telephone number by drawing dial tone on the first telephone loop and by "touch-toning" the first telephone number for processing by the serving switching center, answering the incoming call by the first party at the first telephone number and keying-in a confirmation code by the first party, detecting the confirmation code by the controller, initiating by the controller a second outgoing telephone call to the second telephone number by drawing dial tone on the second telephone loop and by "touch-toning" the second telephone number for processing by the serving switching center, bridging by the controller the first party to the second telephone loop so the first party may listen to the ring-back signal from the second outgoing call, if the second party answers the second outgoing call, completing a talking path between the first party and second party over the first and second loops by bridging the first and second loops within the controller to establish a bridged connection, if the second party does not answer the second outgoing call within an expected time interval, signaling the controller to drop both connections by the first party keying-in the confirmation code, upon completion of conversation between the first party and second party, dropping the bridged connection by the second party hanging up on the second telephone loop, signaling the controller to drop the connection to the first party by keying-in the confirmation code, and monitoring by the controller the first telephone loop for the confirmation code and, upon receipt of the code, hanging up the controller on the first telephone loop.

3. A method for interconnecting first and second subscriber loops with a controller located at a subscriber premises wherein both the loops terminate in the controller, the method comprising the steps of receiving input signals remotely applied to the first loop, storing two phone numbers remotely received in the controller, applying the first phone number to the first subscriber loop, applying the second phone number to the second subscriber loop, and bridging the first subscriber loop and the second subscriber loop within the controller after the application of the phone numbers to the loops.

4. The method as recited in claim 3 wherein the loops are served by a central office and the first loop provides a third-party calling function, the method further including, after the step of storing, the step of storing a third phone number remotely received in the controller, and after the step of applying the first phone number, the step of invoking the third-party calling function and applying the third party phone number to the first loop.

5. The method as recited in claim 4 wherein the second loop also provides the third-party calling function, the method further including after the step of storing a third phone number, the step of storing a fourth phone number remotely received in the controller, and after the step of applying the second phone number, the step of invoking the third party calling function on the second loop and applying the fourth phone number to the second loop.

6. The method as recited in claim 3 wherein the loops are served by a central office and the second loop provides a third-party calling function, the method further including, after the step of storing, the step of storing a third phone number remotely received in the controller, and after the step of applying the second phone number, the step of invoking the third-party calling function and applying the third party phone number to the second loop.

7. A method for interconnecting first and second subscriber loops with a controller located at a subscriber premises wherein both the loops terminate in the controller, the method comprising the steps of receiving input signals remotely applied to the first loop, storing a first phone number remotely received in the controller, applying the first phone number to the first subscriber loop, storing a second phone number remotely received over the first loop in the controller upon the establishment of a call connection between the controller over the first loop and equipment terminating the first phone number, the second phone number being provided by the party responding to an alerting signal provided by the equipment, applying the second phone number to the second subscriber loop, and bridging the first subscriber loop and the second subscriber loop within the controller after the application of the phone numbers to the loops.

8. The method as recited in claim 7 wherein the step of applying the first phone number includes the step of applying the first phone number at a predetermined time.

9. A controller located at a subscriber premises for interconnecting first and second subscriber loops which terminate in the controller, the controller comprising input means connectable to the first subscriber loop for receiving input signals remotely applied to the first loop, output means connectable to the first and second subscriber loops for applying output signals independently to each of the loops, means, responsive to the input signals, for storing two phone numbers received from a remote location via the input means, for applying one of the phone numbers to the first subscriber loop via the output means, and for applying the other of the phone numbers to the second subscriber loop via the output means, and means, coupled to the input means and the output means, for bridging the first subscriber loop and the second subscriber loop within the controller after the application of the phone numbers to the loops.

* * * * *